Patented May 28, 1940

2,202,037

UNITED STATES PATENT OFFICE 2,202,037

ACID INDOLYLDIPHENYLMETHANE DYESTUFF

Paul Wolff and Emil Beniers, Frankfort-on-the-Main, Germany, assignors to General Aniline & Film Corporation, a corporation of Delaware No Drawing. Application May 13, 1938, Serial No. 207,787. In Germany May 24, 1937

1 Claim. (Cl. 260—319)

The present invention relates to acid indolyldiphenylmethane dyestuffs.

We have found that acid indolyldiphenylmethane dyestuffs of valuable properties are obtainable by condensing either a 4.4'-dihalogenbenzophenone-2-sulfonic acid or a 4-amino-4'-halogenbenzophenone-2-sulfonic acid, the amino group of which may contain as substituent an alkyl, aralkyl, aryl or $\omega$-sulfo-alkyl radical, with an alpha-substituted indole compound containing no substituent in beta-position, simultaneously or separately sulfonating the product thus obtained if it does not already contain two sulfonic acid groups and causing the halogen atoms situated in para-positions to the methane-carbon atom to react with a primary aromatic amine which contains an alkoxy group in para-position to the amino group or carrying out the sulfonation after the reaction with the said primary aromatic amine.

The 4,4'-dihalogen-benzophenone-2-sulfonic acids are obtainable by condensing by the Friedel-Craft's reaction a 4-halogen-2-sulfobenzoic acid anhydride with a halogen-benzene in the presence of aluminium chloride.

The 4-amino-4'-halogen-benzophenone-2-sulfonic acids are obtainable by sulfonating with fuming sulfuric acid containing 30 per cent of sulfuric anhydride at a raised temperature, for instance, 100° C. a 4-nitro-4'-halogen-benzophenone, obtainable by condensation of para-nitro-benzoyl chloride with a halogen-benzene by the Friedel-Craft's reaction, and reducing in known manner the 4-nitro-4'-halogen-benzophenone-2-sulfonic acids obtained to the amino compounds.

The practicability of the present process could not be foreseen since the benzophenone compounds used as parent materials contain in ortho-position to the keto-group a sulfonic acid group which might interfere with the condensation to the indolyldiphenylmethane dyestuffs. The dyestuffs obtainable according to the present invention are distinguished from the known dyestuffs by more even and more beautiful dyeings.

The following examples illustrate the invention, but they are not intended to limit it thereto:

(1) 1 mol of sodium-4,4'-dichlorobenzophenone-2-sulfonate is condensed with 1 mol of 1-isobutyl-2-para-chlorophenyl-4,6-dimethylindole by heating for 15–20 hours at about 45° C. to about 50° C. in chloro-sulfonic acid during which operation simultaneously sulfonation to the disulfonic acid occurs. The condensation product is isolated by pouring the whole into water, washed until free from acid, and after drying, heated at 120° C. for several hours, for instance 2–3 hours, in an excess of para-anisidine. The dyestuff is freed from the excess of para-anisidine by stirring it with dilute hydrochloric acid and then isolated. It dyes wool and silk clear greenish-blue tints of very good fastness properties. The dyestuff has the following probable formula:

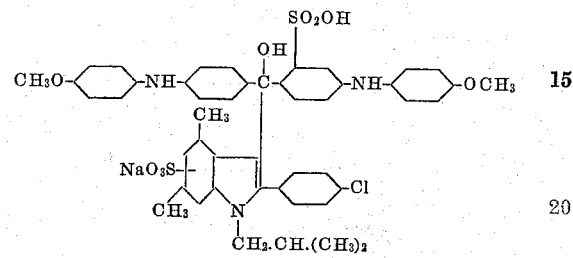

(2) 1 mol of 4-amino-4'-chlorobenzophenone-2-sulfonic acid is condensed with 1 mol of 1-methyl-2-phenylindole by heating for 24 hours at about 70° C. to about 80° C. in concentrated hydrochloric acid in the presence of zinc chloride. The condensation product is isolated by pouring the whole into water and washed free from acid. After drying, it is heated at 120° C. for 4 hours with an excess of para-phenetidine. The dyestuff mono-sulfonic acid is freed in the usual manner from the excess of para-phenetidine, dried and sulfonated to the disulfonic acid by heating it in concentrated sulfuric acid at about 45 to about 50° C. In this manner a dyestuff is obtained which in the form of the sodium salt dyes wool and silk violet tints of very good properties of fastness. The dyestuff has the following probable formula:

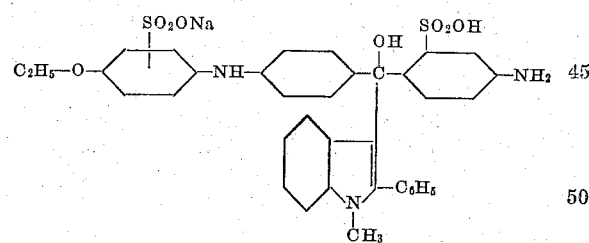

(3) The 4-monobenzylamino-4'-chlorobenzophenone-2-sulfonic acid obtained by benzylation with benzyl chloride in an aqueous sodium carbonate solution is condensed as indicated in Example 2 with 1-methyl-2-phenylindole, then melted together with para-phenetidine and thereupon sulfonated. A dyestuff is obtained which in the form of the sodium salt dyes wool and silk violet tints of very good properties of fastness. If the sulfonation to the disulfonic acid is carried out before the melting with para-phenetidine, the sulfo-group enters into another position of the dyestuff molecule and a dyestuff is obtained which dyes wool and silk shades essentially bluer than those of the isomeric dyestuff, but with the same good properties of fastness.

(4) The 4-omega-sulfethylamino-4'-chlorobenzophenone-2-sulfonic acid (disodium salt) obtained by heating sodium-omega-chlorethanesulfonate with 4-amino-4'-chlorobenzophenone-2-sulfonic acid in an aqueous solution is condensed with 1-methyl-2-phenylindole as indicated in Example 2 and the dyestuff thus obtained is heated in the dry state with para-phenetidine for 2 to 3 hours at 120° C. The dyestuff is freed from the excess of para-phenetidine. In the form of the sodium salt the dyestuff dyes wool and silk violet tints which are distinguished by an especial clarity and have very good properties of fastness. The dyestuff has the following probable formula:

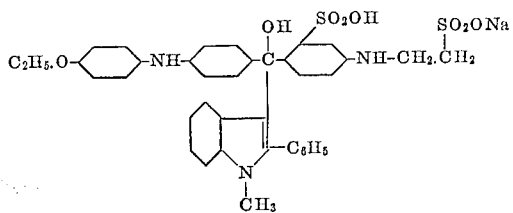

We claim:
The compound of the formula:

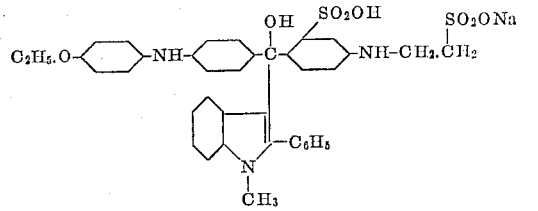

being a dyestuff which dyes wool and silk violet tints which are distinguished by an especial clarity and have very good properties of fastness.

PAUL WOLFF.
EMIL BENIERS.